(12) United States Patent
Marshall

(10) Patent No.: US 8,517,749 B2
(45) Date of Patent: Aug. 27, 2013

(54) SYSTEM FOR QUICK DISCONNECT TERMINATION OR CONNECTION FOR CRYOGENIC TRANSFER LINES WITH SIMULTANEOUS ELECTRICAL CONNECTION

(75) Inventor: William Scott Marshall, Tallahassee, FL (US)

(73) Assignee: American Superconductor Corporation, Devens, MA (US)

( * ) Notice: Subject to any disclaimer, the term of this patent is extended or adjusted under 35 U.S.C. 154(b) by 560 days.

(21) Appl. No.: 12/231,767

(22) Filed: Sep. 5, 2008

(65) Prior Publication Data

US 2009/0123221 A1 May 14, 2009

Related U.S. Application Data

(60) Provisional application No. 60/967,868, filed on Sep. 7, 2007.

(51) Int. Cl.
*F16L 25/01* (2006.01)
*H01R 4/60* (2006.01)

(52) U.S. Cl.
USPC ...... 439/194; 439/195; 285/904; 285/123.15; 285/47; 62/50.7

(58) Field of Classification Search
USPC ............. 285/904, 47, 52, 123.15; 62/50.1, 62/50.7; 439/191, 194, 195
See application file for complete search history.

(56) References Cited

U.S. PATENT DOCUMENTS

| | | | |
|---|---|---|---|
| 2,750,569 A * | 6/1956 | Moon | 439/194 |
| 2,980,448 A * | 4/1961 | Holben | 285/47 |
| 3,137,143 A * | 6/1964 | Richards et al. | 62/50.7 |
| 3,316,931 A * | 5/1967 | Elrod | 137/339 |
| 3,381,260 A * | 4/1968 | Brown | 439/382 |
| 3,712,583 A * | 1/1973 | Martindale et al. | 251/149.4 |
| 3,775,989 A * | 12/1973 | Mursinna et al. | 62/50.7 |
| 3,842,614 A * | 10/1974 | Karcher et al. | 62/56 |
| 3,988,029 A * | 10/1976 | Gibson | 285/47 |
| 4,011,732 A * | 3/1977 | Doherty et al. | 62/50.7 |
| 4,111,452 A * | 9/1978 | Carlsson | 280/421 |
| 4,302,064 A * | 11/1981 | Spinner | 439/198 |
| 4,486,060 A * | 12/1984 | Currall | 439/191 |
| 4,491,347 A * | 1/1985 | Gustafson | 285/47 |
| 5,637,006 A * | 6/1997 | Almeras | 439/191 |
| 5,658,159 A * | 8/1997 | Gardner et al. | 439/294 |
| 6,079,446 A * | 6/2000 | Tocha | 137/614.06 |
| 6,134,893 A * | 10/2000 | Bonn | 62/50.7 |
| 6,145,322 A * | 11/2000 | Odashima | 62/50.7 |
| 6,780,037 B1 * | 8/2004 | Parmeter et al. | 439/191 |
| 7,052,047 B1 * | 5/2006 | Box et al. | 285/123.15 |
| 7,137,651 B2 * | 11/2006 | Bonn | 285/123.5 |
| 7,390,032 B2 * | 6/2008 | Hughes | 285/330 |

* cited by examiner

*Primary Examiner* — James Hewitt
(74) *Attorney, Agent, or Firm* — Occhiuti Rohlicek & Tsao LLP

(57) ABSTRACT

An apparatus that enables quick disconnect termination or connection for cryogenic transfer lines is presented. The apparatus is a connector that will allow two lines to be connected and coupled for simultaneously allowing for fluid to occur and electrical communication to ensue. Connection and termination will occur successfully under a pressurized environment.

18 Claims, 10 Drawing Sheets

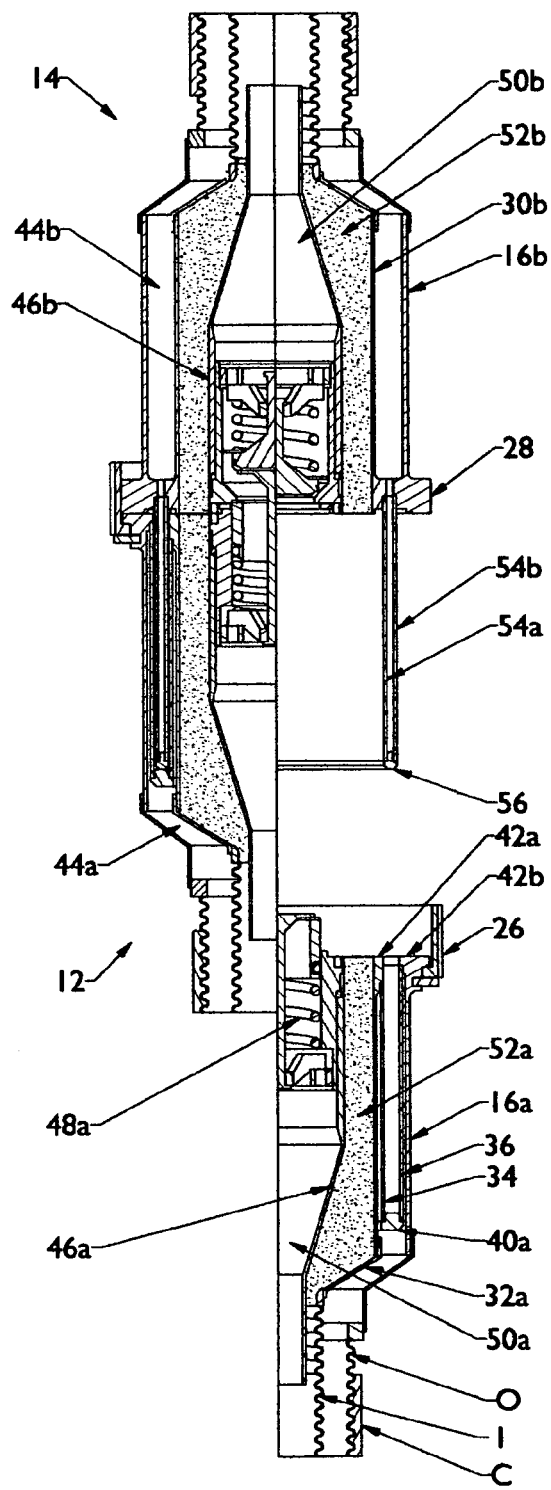
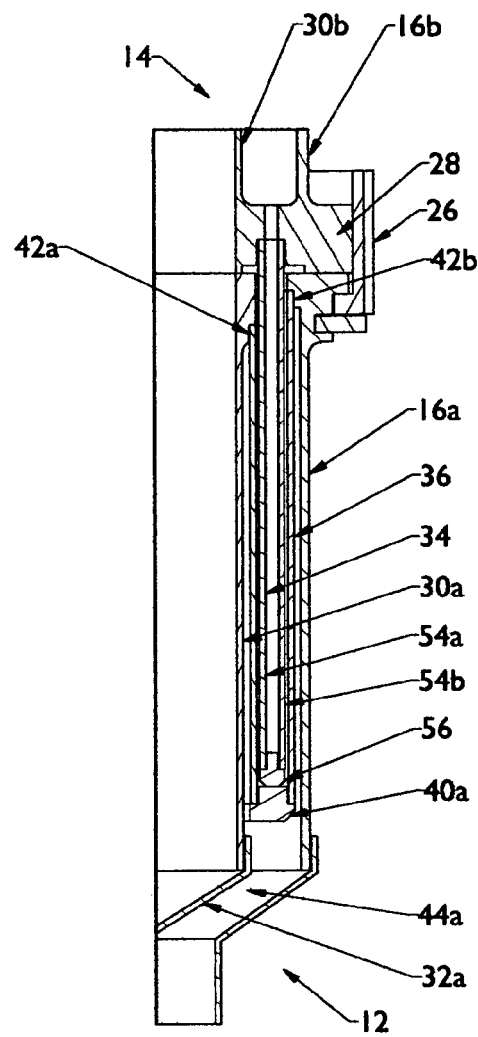
Fig. 6a
Fig. 6b

SYSTEM FOR QUICK DISCONNECT TERMINATION OR CONNECTION FOR CRYOGENIC TRANSFER LINES WITH SIMULTANEOUS ELECTRICAL CONNECTION

This is a utility application claiming priority of Provision Application No. U.S. 60/967,868 filed on Sep. 7, 2007.

FEDERALLY SPONSORED

This is a federally sponsored project, sponsored by the Office of Naval Research SBIR Contract # N00014-08-C-0163

BACKGROUND OF THE INVENTION

1. Field of the Invention

The present invention relates generally to an apparatus designed and configured to enable quick disconnect termination or connection for cryogenic transfer lines. More particularly, the present invention will render successful mating between two lines by coupling cryogenic spaces while simultaneously enabling an electrical connection to occur therein.

2. Description of the Prior Art

Connectors, also known as couplers, are well known in the art and are used in a variety of fields and areas. The purpose of a connector is to mate lines in order to form a continuous route for a particular flow configuration. For example, connectors having valves therein, such as the coupler disclosed in U.S. Pat. No. 6,145,322 will enable fluid flow to occur or not occur when desired. Such a configuration is ideally suited for connecting or disconnecting fluid passages, even under a low temperature condition. Though successful in its use, this assembly, like many other connectors have not addressed a high-pressure environment, such as when utilizing cryogenic materials. Cryogenic material, as known in the art, is gases under normal atmospheric condition, but will become a liquid when it is cooled and pressurized.

In such a configuration, pressurized fluid is desired for fluid flow. This will provide for the transfer of pressured fluid from one line to a second line. In the past, bayonet couplers, such as the one disclosed in U.S. Pat. No. 7,052,047, have been used to couple lines under a high-pressure environment. Though efficient in transferring fluid under a pressurized state, the invention fails to discuss simultaneously providing an electrical connection to be continuous when a fluid flow has been successful.

It can be seen that there exists a need for a connector that can enable connection or disconnection of a pressurized fluid, quickly, efficiently and successfully. Such an apparatus should be simple in construction and compact in size so as to provide a device, which is successful, and can easily be used by any individual with minimal to no training required for facilitating its used.

As will be seen, the present invention achieves its intended purposes, objectives and advantages by accomplishing the needs as identified above, through a new, useful and unobvious combination of component elements, which is simple to use, with the utilization of a minimum number of functioning parts, at a reasonable cost to manufacture, assemble, and test and by employing only readily available material.

SUMMARY OF THE INVENTION

The present invention is a device that is designed and configured to enable quick disconnects or a quick connect to occur within cryogenic transfer lines. The device of the present invention will enable the user to successfully connect or disconnect a vacuum-jacketed cryogenic conduit.

In order to provide for such a configuration, the present invention comprises a connector having a male termination portion and a female termination portion. The male portion includes opposite ends. The first end being adapted to be removably secured to the female end while the second end is adapted to be secured to a conventional vacuum jacket conduit. The female termination portion also includes opposite ends. The first end being adapted to be removably secured to the male end, while the second end is adapted to be secured to a conventional vacuum jacket conduit.

Both the male and female termination portions each include an inner shell and an outer shell. The inner shells further include a valve assembly for controlling fluid flow. The outer shells enable the union of the outer vacuum jacket of a conventional cryogenic conduit. The use of the outer shells will ensure a vacuum seal.

An alternative embodiment can provide for electrical communication to occur simultaneously when fluid flow is established between the male and female termination portions. The electrical communication is terminated simultaneously when the fluid flow between the male and female termination portions is terminated. In order to provide for such a configuration, the present invention includes an electrical conductor located within the male termination portion and an electrical conductor located within the female termination portion. The electrical conductor being located between the inner shell and the housed valve assembly.

An electrical connecting element provides electrical connection between the electrical conductor and the electrical lines of the conventional conduit. This will provide for the male termination portion and the female termination portion to each include the electrical connecting element. When the male termination portion is coupled to the female termination portion, the electrical communication occurs. Once secured, the electrical conductor of the male termination portion is in contact with the female termination portion. This will consequently provide for the electrical communication path that travels from the conventional conduit, to electrical connection element and to the electrical conductor of one termination portion. Since the electrical conductors are in communication with each other, the electrical communication continues from the second electrical conductor to the electrical connecting element and to the opposite conventional conduit line. Hence providing for simultaneous fluid flow and electrical communication by the use of the present invention.

Accordingly, it is an object of the present invention to provide a coupling device that will overcome the deficiencies, shortcomings, and drawbacks of prior coupling devices and methods thereof.

Another object of the present invention is to provide a coupling device that can successfully and efficiently enable a quick termination and/or activation to occur between two fluid lines.

Still a further object of the present invention is to provide for a coupling device that will simultaneously render fluid flow to occur or terminate while simultaneously allowing electrical connection to occur or cease, respectively.

Yet a further object of the present invention, to be specifically enumerated herein, is to provide a coupling device in accordance with proceeding objects and which will conform to conventional forms of manufacture, be of simple construction and easy to use so as to provide a coupling device that would be economically feasible, long lasting and relatively trouble free during utilization.

Although there have been inventions related to coupling devices, none of the inventions have address the need for simultaneously enabling electrical connection to occur or terminate dependent upon the fluid flow of the cryogenic medium. The present invention meets the requirements of the simplified design, compact size, and ease of installation and maintainability to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 6a is a cross-sectional view of the male termination portion mating with the female termination portion for the first embodiment of the present invention.

FIG. 6b is an enlarged view of the nested tubes used in the female termination portion of the coupling device of the present invention.

Similar reference numerals refer to similar parts throughout the several views of the drawings.

DETAILED DESCRIPTION OF THE PREFERRED EMBODIMENT

Figure 1:
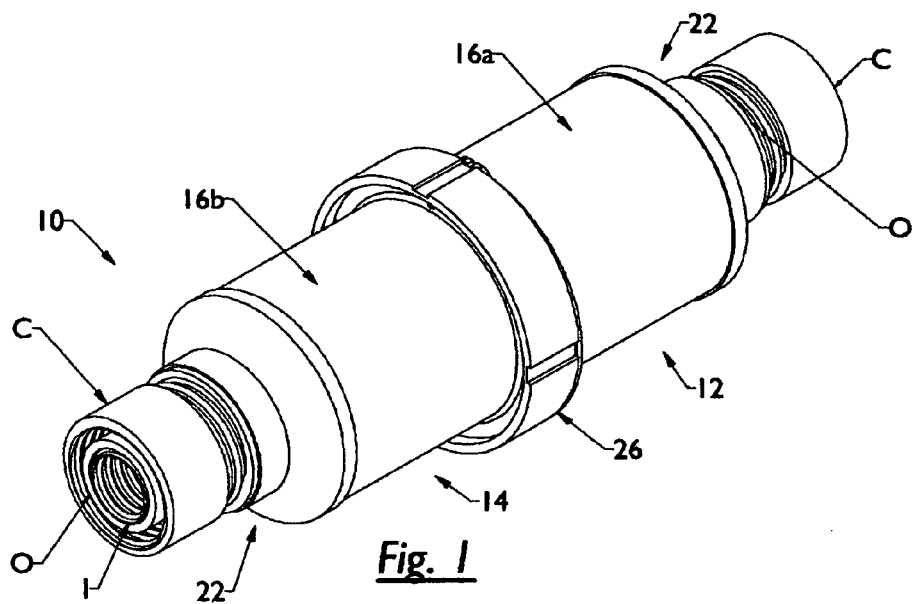
FIG. 1 is an isometric view of the male termination portion coupled to the female termination portion of the coupling device of the present invention.

With reference to the drawings, in particular to FIGS. 1-12 thereof, the present invention, a coupling device, denoted by reference numeral 10 will be described. Shown is a coupling device 10 that is designed and configured to provide a successful and efficient means of a quick connection and/or disconnection between two vacuum-jacketed cryogenic conduits. The connection via the present invention 10 will prevent leakage of the cryogenic medium during the connection and disconnection phase. Thereby providing a device that enables connection to occur under a pressurized environment.

In all the embodiments defined below the fluid used within the conduit can be any conventional fluid. Thereby providing for the cryogenic fluid consisting of a single phase or two phase cryogenic cooling fluid of helium, nitrogen, air, argon, oxygen, hydrogen, xenon, neon, methane, or a mixture thereof.

Figure 2:
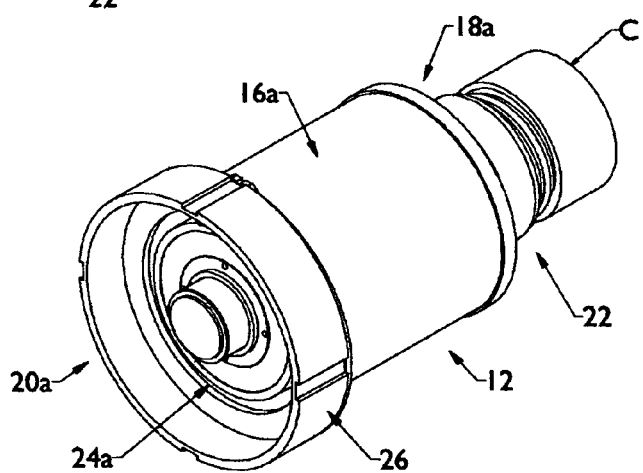
FIG. 2 is an isometric view of the first embodiment of the female termination portion of the coupling device of the present invention.
Figure 3:
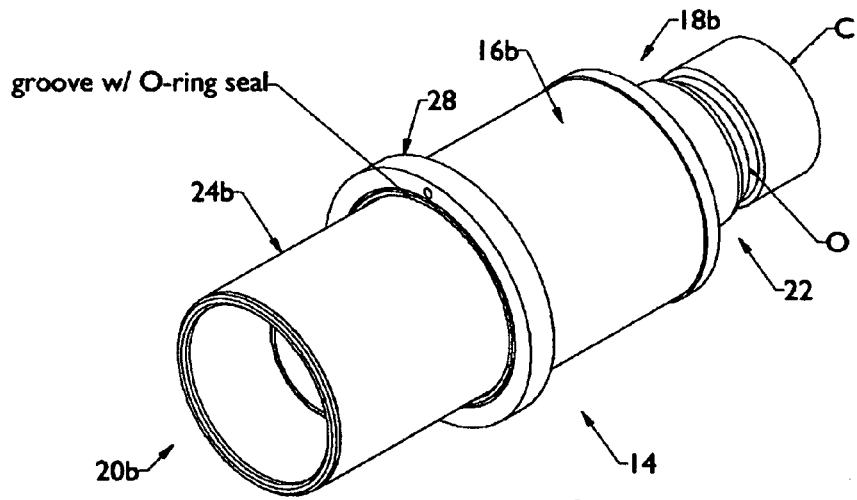
FIG. 3 is an isometric view of the male termination portion of the coupling device of the present invention.
Figure 4A:
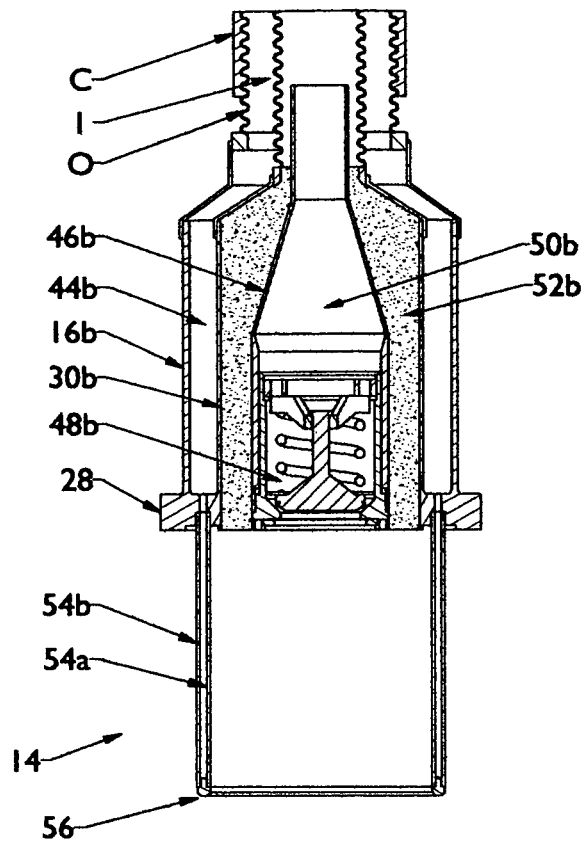
FIG. 4a is a cross-sectional view of the first embodiment for the male termination portion of the coupling device of the present invention.
Figure 4B:
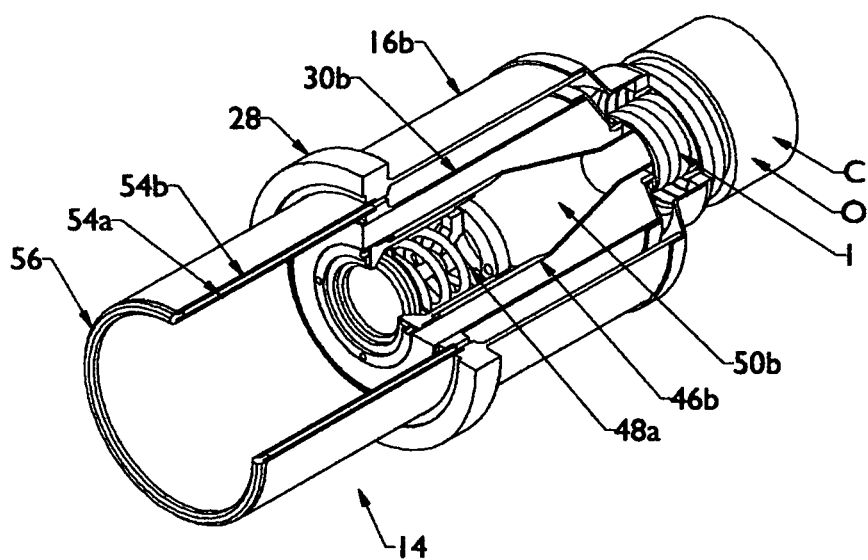
FIG. 4b is a partial cut-away isometric view of the first embodiment for the male termination portion of the coupling device of the present invention.

In order to provide for such a successful connection, the first embodiment of the present invention 10, as seen in FIGS. 1-3, comprises a female termination portion 12 (FIGS. 1 and 2) and a male termination portion 14 (FIGS. 1 and 3). The female and male termination portions being adapted to be removably secured to each other. It is noted that shown is the use of female and male connecting means, but it is to be understood by those skilled in the art that other forms can be utilized when mating or connecting the termination portions.

As seen in these drawings, the female and male termination portions each include an outer shell 16a and 16b, respectively. Each shell member has opposite ends. The ends being 18a and 20a for the female termination portion and 18b and 20b for the male termination portion.

Extending outwardly from the first end 18a and 18b of each termination portion is a receiving end 22. This receiving end is structured so as to receive and mate with a conventional cryogenic conduit. Partially shown attached to each receiving end 22 is a conventional cryogenic conduit C. This conventional cryogenic conduit includes an inner jacket I, illustrated in FIGS. 1-6b, and an outer jacket O. The purpose of the receiving ends is to receive these members and to provide for a hermetic seal. The design of the receiving ends is dependent upon the structure of the conventional cryogenic conduit. Thereby providing for the present invention to be adjusted so as to be utilized with any conventional conduit. It is further noted that each receiving end 22 is an end cap that provides an adequate hermetic seal for the outer shell of each termination portion and the outer jacket of the conventional conduit.

Located on the opposite side of the receiving end 22, at end 20a of the female termination portion 12, shown in FIGS. 1, 2, 5a and 5b is a female mating member 24a. Located on the opposite side of the receiving end 22, at end 20b of the male termination portion 14, shown in FIGS. 1, 3, 4a, and 4b is a male mating member 24b. The male mating member 24b will receive the female mating member 24a for providing a connection therein.

Extending circumferentially on the female mating member 24a, shown in FIGS. 1, 2 and 5a-6b, is a threaded, rotating collar-receiving component 26. The male mating member 24b, shown in FIGS. 1, 3-4b, 6a and 6b, includes a threaded, fixed sealing collar 28, which extends circumferentially thereon. The collar receiving component 26 will receive the male sealing collar 28 to provide for a threaded, rotatable securement between the outer shells 16a and 16b of each termination portion, as shown in FIGS. 1, 6a and 6b, when the male termination portion mates with the female termination portion. A seal is made between the O-ring, placed in the groove shown in 26 and the flat face on 24b.

Figure 5A:
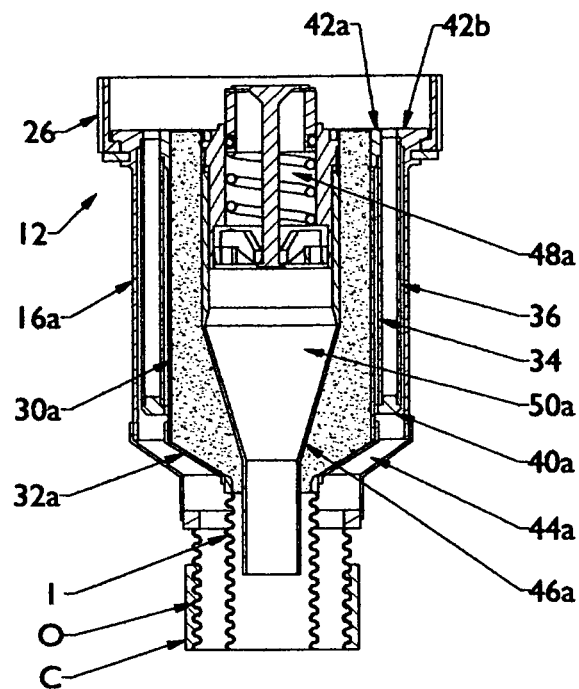
FIG. 5a is a cross-sectional view of the first embodiment for the female termination portion of the coupling device of the present invention.
Figure 5B:
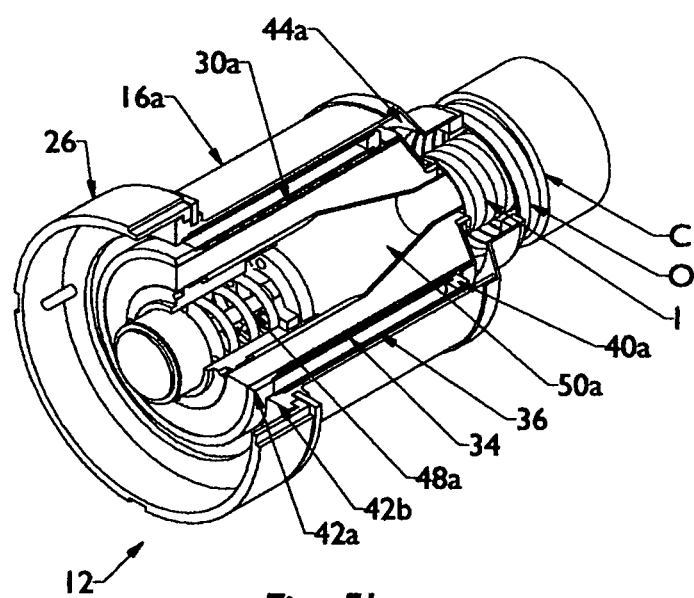
FIG. 5b is a partial cut-away isometric view of the first embodiment for the female termination portion of the coupling device of the present invention.

The female termination portion 12, as seen in FIGS. 5a and 6b further includes an inner shell 30a having opposite ends 32a and 32b. The first end 32a being designed and configured to include several tubes or conical structures, so as to make a hermetic seal to the end of the inner jacket I of the conventional conduit C. As seen, this first end 32a is an end cap that provides the adequate hermetic seal for the inner shell and for the inner jacket of the conventional conduit. Located between and parallel to the inner shell 30a and the outer shell 16a are an inner nested tube 34 and an outer nested tube 36. The inner nested tube 34 being located next to the inner shell 30a. The outer nested tube 36 being located next to the outer shell 16a. An enlarged view of the nested tubes is shown in further detail in FIG. 6b. The inner nested tube 34 and the outer nested tube 36 form gap there between which will receive the male mating member 24b of the male termination portion 12, as shown in FIGS. 6a and 6b.

Each tube includes outer ends, illustrated but not labeled. As seen in FIGS. 5-6b, the first end of the inner nested tube 34 is secured to the first end of the outer nested tube 36 via spacer 40a. This will provide for the first ends of the inner nested tube 34 and the first end of the outer nested tube 36 to be hermetically sealed. A second spacer 40b is used to secure the first end of the inner tube to the inner shell 30. This will provide for a hermetic seal therein. The second end of the inner nested tube 34 being secured to the second end 32b of the inner shell 30a via spacer member 42a. This will provide for the second ends of the inner shell 30a and inner nested tube 34 to be hermetically sealed. For securing the second end of the outer nested tube 36 to the outer shell 16a, member 42b is utilized. This member 42b will provide for the second end of the outer nested tube 36 to be hermetically sealed to the outer casing 16 at the receiving end of the female termination portion 12. As seen in FIGS. 5a-6b, the hermetically sealed ends of outer shell, inner shell, outer nested tube and inner nested tube inherently form an evacuated space 44a. This evacuated space is in communication with the evacuated space in the conventional vacuum jacket cryogenic conduit (space located between the inner and outer jackets, I and O respectfully. The configuration of the evacuated space 44a is such that the outer shell 16a will be coupled to the outer jacket in order to assure that the joint will be sealed against vacuum. It is noted that the evacuated space has proven to be successful and ultimately provide an exceptional means of thermal insulation. It is to be understood by those skilled in the art that other means and methods of insulation can be utilized to produce favorable results. The use of the vacuum jacket as disclosed and defined herein is the preferred embodiment for executing the present invention.

Located within the inner shell 30a is an inner sleeve 46a. Secured within the inner sleeve 46a is a conventional valve member 48a. The valve member 48a is a conventional element and it is to be understood by those skilled in the art that other valve assemblies can be used to produce favorable results. It is noted that a spring loaded valve member has been used to produce favorable results.

Extending outwardly from the valve member 48a is a cryogen guide channel 50a. Securing the valve member 48a and the cryogen guide channel 50a to the inner shell 30a is an encapsulated filled material which innately forms an encapsulated filled region 52a. This encapsulated filled region will aid in the prevention of leakage of the cryogenic medium.

The male termination portion 14, as seen in FIGS. 4a, 4b, 6a and 6b, will mate with and receive the female termination portion 12 to provide for a connector that enables fluid flow. Disconnection of the male termination portion 14 to the female termination portion will prevent fluid flow. To provide for such a configuration, the male termination portion 14 further includes an inner shell 30b having opposite ends. The first end, illustrated, but not labeled, being substantially the same as the first end 32a of the female termination portion 12. Thereby, the first end being designed and configured to include several tubes or conical structures, so as to make a hermetic seal to the end of the inner jacket I of the conventional conduit C. As seen, this first end is an end cap that provides an adequate hermetic seal for the inner jacket of the conventional conduit.

Extending outwardly from the sealing collar 28 is an inner nested tube 54a and an outer nested tube 54b. The inner nested tube 54a includes outer end that is illustrated, but not labeled. The first end of the inner nested tube being secured to the inner shell 30b via the sealing collar 28. This will provide for the first end of the inner nested tube 54a to be hermetically sealed to the inner shell 30b. The outer nested tube 54b being secured to the outer shell 16b via the sealing collar 28. This will provide for the first end of the outer nested tube 54b to be hermetically sealed to the outer shell 16b. The outer nested tube 54b being secured to the inner nested tube 54a via end member 56. In the preferred embodiment, a circumferential opening 58 extends between the sealing collar 28. This opening is evacuated to provide an insulating space between inner and outer tubes 54a and 54b. This circumferential opening has been utilized to produce favorable results. In an alternative configuration, a plurality of apertures or opening can be used in lieu of the circumferential opening.

The nested tubes, 54a and 54b, respectively, are designed and configured to be received within the gap formed between the inner nested tube 34 and the outer nested tube 36 of the female termination portion 12. The receipt of the outer nested tubes received within the female termination portion is shown in FIGS. 6a and 6b. As seen in FIGS. 4a, 4b, 6a and 6b, the hermetically sealed ends of outer shell, inner shell, outer nested tube and inner nested tube inherently form an evacuated space 44b. This evacuated space is in communication with the evacuated space in the conventional vacuum jacket cryogenic conduit (space located between the inner and outer jackets, I and O respectfully). The configuration of the evacuated space 44b is such that the outer shell 16b will be coupled to the outer jacket in order to assure that the joint will be sealed against vacuum. It is noted that the evacuated space has proven to be successful and ultimately provide an exceptional means of thermal insulation. It is to be understood by those skilled in the art that other means and methods of insulation can be utilized to produce favorable results. The use of the vacuum jacket as disclosed and defined herein is the preferred embodiment for executing the present invention.

Located within the inner shell 30b is an inner sleeve 46b. Secured within the inner sleeve 46b is a conventional valve member 48b. The valve member 48b is a conventional element and it is to be understood by those skilled in the art that other valve assemblies can be used to produce favorable results. It is noted that a spring loaded valve member has been used in the embodiments as described herewith.

Extending outwardly from the valve member 48b is a cryogen guide channel 50b. Securing the valve member 48b and the cryogen guide channel 50b to the inner shell 30b is an encapsulated filled material which innately forms an encapsulated filled region 52b. This encapsulated filled region will aid in the prevention of leakage of the cryogenic medium.

Hence, in order to utilize the present invention, the valve in the male and female termination portions prevent fluid flow to occur during the disconnect stage via the valve members. Upon connection, the nested tubes 54a and 54b of the male termination portion is inserted in between the inner nested tube 34 and the outer nested tube 36 of the female termination portion. Once located therein, the receiving collar of the female portion will receive the sealing collar of the male portion provide for a locking system to lock the male termination portion to the female termination portion. In the preferred embodiment, a threaded system for locking the two portions can be utilized. In this configuration the rotating collar 26 and fixed collar 28 are threaded to render the user to turn the portions in order to lock and secure the male termination portion to the female termination portion. Once locked in place, the valves are activated for enabling fluid flow to occur. As seen in FIG. 6a, the springs of the valves are compressed and thus illustrate the coupler 10 in an open position for allowing fluid flow to occur. Due to the extended length of the elongated inner nested tube 54a and outer nested tube 54b, and elongated outer nested tubes 34 and 36, minimal heat loss occurs, consequently increasing the success and efficiency of the connector of the present invention. It is noted that other locking methods can be used to produce favorable results. Such methods can include, but not be limited to, sliding locking mechanisms, locking mechanism using pins, or the like.

For further enhancing and increasing the application of the present invention, the coupling device 10 can be altered so as to provide for a simultaneous electrical connection to occur between the male and female termination portions. This alternative embodiment is shown in FIGS. 7a-9. In this embodiment, the configuration is ideally suited for connections utilizing flat tape conductors, including high temperature superconducting (HTS) material. As seen, the outer and inner shells include substantially the same shape and configuration as the first embodiment. Thus, the female and male termination portions each include an outer shell 16a and 16b, respectively. It is noted that shown is the use of female and male connecting means, but it is to be understood by those skilled in the art that other forms can be utilized when mating or connecting the termination portions.

Each termination portion includes a receiving end 22 that extends outwardly therefrom for receiving and mating with a conventional cryogenic conduit. Partially shown attached to each receiving end 22 is a conventional cryogenic conduit C. This conventional cryogenic conduit includes an inner jacket I and an outer jacket O. The purpose of the receiving ends is to receive these members and to provide for a hermetic seal. The design of the receiving ends is dependent upon the structure of the conventional cryogenic conduit. This design, like in the first embodiment, provides for the receiving end to be an end cap for allowing the hermetic seal to occur therein.

Figure 8A:
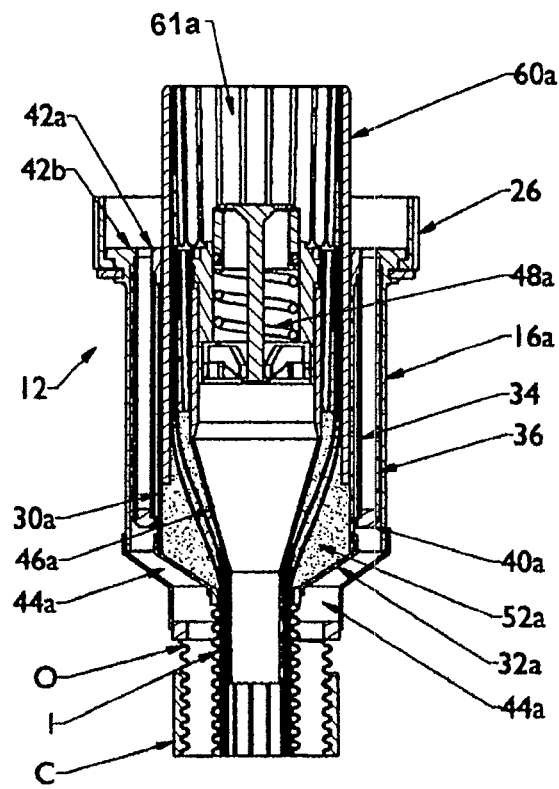
FIG. 8a is a cross-sectional view of the second embodiment for the female termination portion of the coupling device of the present invention.
Figure 8B:
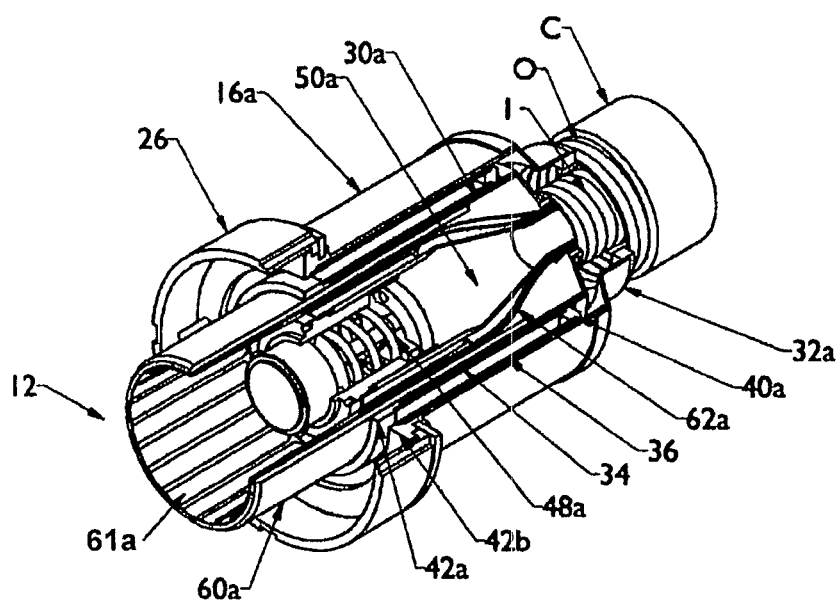
FIG. 8b is a partial cut-away isometric view of the second embodiment for the female termination portion of the coupling device of the present invention.
Figure 9:
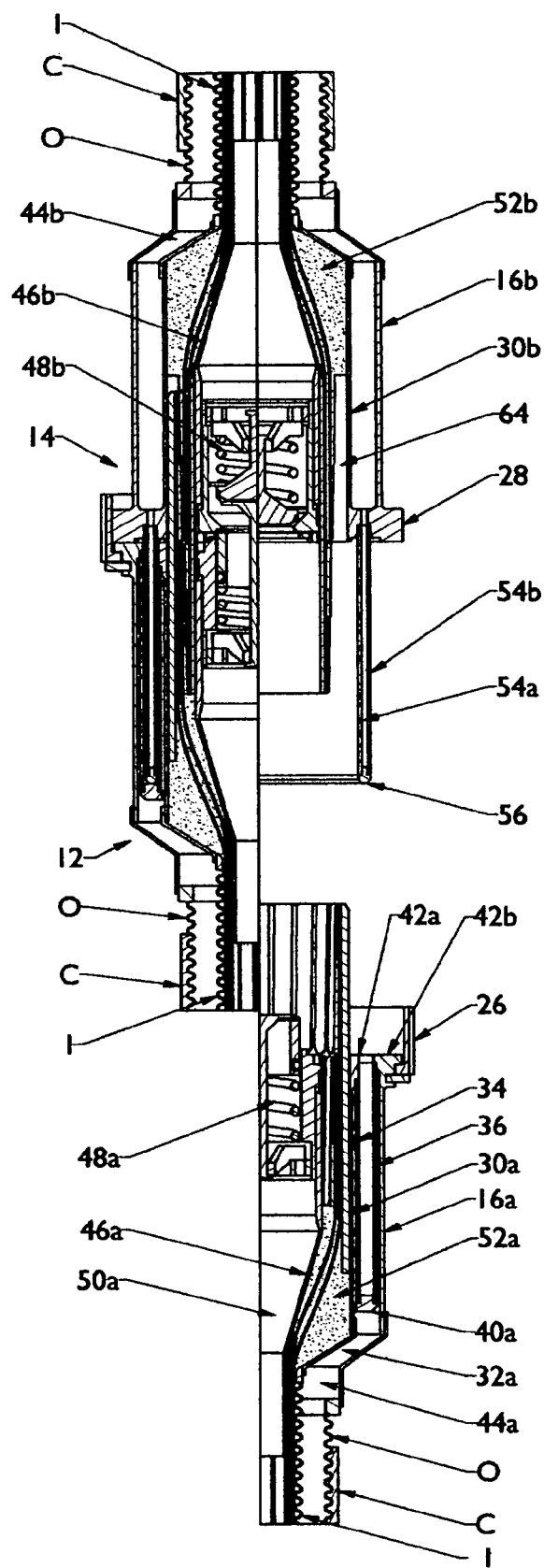
FIG. 9 is a cross-sectional view of the male termination portion mating with the female termination portion for the second embodiment of the present invention.

Located on the opposite side of the receiving end 22, of the female termination portion 12, shown in FIGS. 8a, 8b, and 9, is a female mating member. This female mating member being substantially the same as the female mating member as disclosed in the first embodiment. The female termination portion further includes an inner shell 30a having opposite ends 32a and 32b. The first end 32a being designed and configured to include several tubes or conical structures, so as to make a hermetic seal to the end of the inner jacket I of the conventional conduit C. Thereby providing for this first end to be an end cap for enabling the hermetic seal to occur therein. Located between and parallel to the inner shell 30a and the outer shell 16a are an inner nested tube 34 and an outer nested tube 36. The inner nested tube 34 being located next to the inner shell 30a. The outer nested tube 36 being located next to the outer shell 16a. The inner nested tube 34 and the outer nested tube 36 form gap there between which will receive the male mating member 24b of the male termination portion 12, as shown in FIG. 9.

As seen in FIGS. 8a, 8b, and 9, the first end of the inner nested tube 34 is secured to the first end of the outer nested tube 36 via spacer 40a. This will provide for the first ends of the inner nested tube 34 and the first end of the outer nested tube 36 to be hermetically sealed. A second spacer 40b is used to provide a hermetic seal between the first end of the inner tube to the inner shell. The second end of the inner nested tube 34 being secured to the second end 32b of the inner shell 30a via spacer member 42a. This will provide for the second ends of the inner shell 30a and inner nested tube 34 to be hermetically sealed. For securing the second end of the outer nested tube 36 to the outer shell 16a, member 42b is utilized. This member 42b will provide for the second end of the outer nested tube 36 to be hermetically sealed to the outer casing 16 at the receiving end of the female termination portion 12. It is noted that the nested configuration of the first embodiment is substantially the same as this second embodiment. Thus, the illustration of the nested tubes in FIG. 6b is substantially the same as the configuration for the nested tubes of the second embodiment.

The hermetically sealed ends of outer shell, inner shell, outer nested tube and inner nested tube inherently form an evacuated space 44a. This evacuated space is in communication with the evacuated space in the conventional vacuum jacket cryogenic conduit, which is the space located between the inner and outer jackets, I and O respectfully. The configuration of the evacuated space 44a is such that the outer shell 16a will be coupled to the outer jacket in order to assure that the joint will be sealed against vacuum. It is noted that the evacuated space has proven to be successful and ultimately provide an exceptional means of thermal insulation. It is to be understood by those skilled in the art that other means and methods of insulation can be utilized to produce favorable results. The use of the vacuum jacket as disclosed and defined herein is the preferred embodiment for executing the present invention.

Located within the inner shell 30a is an inner sleeve 46a. Secured within the inner sleeve 46a is a conventional valve member 48a. Extending outwardly from the valve member 48a is a cryogen guide channel 50a. Securing the valve member 48a and the cryogen guide channel 50a to the inner shell 30a is an encapsulated filled material which innately forms an encapsulated filled region 52a. This encapsulated filled region will aid in the prevention of leakage of the cryogenic medium.

Contained in the annular region between the inner sleeve 46a and the inner shell 30a is an electrical connecting element 60a. For this embodiment the electrical connecting element

60a is comprised of a circular array of several wedge-shaped contacts 61a, soldered to an electrical conductor 62a on the backside. The electrical conductor can be any conventional electrical element that will enable electricity to travel therethrough. Electrical conductors, such as, but not limited to copper wiring, high temperature superconducting (HTS) tape or the like can be utilized. It is noted that this particular embodiment has used HTS to produce favorable results. As disclosed any type of connecting elements can be used. As seen in the drawings, each contact 61a is electrically isolated from its neighbors. It is further noted that examples of electrical contacts that can be used include a pressed contact, a spring loaded contact, a soldered contact, a brazed contact, a welded contact, or a combination thereof. In addition the material used for the electrical contacts for the disclosed embodiments can be any materials know to produce favorable results. In addition, the electrical contacts can be coated, as in known in the art for lowering the electrical contact resistance. This coating can be selected from the group consisting of Au, Ag, Ni, solder or the like. The coating can be thin such as between 0.5-2.0 thousandth of an inch.

As shown in FIGS. 8a-8b, connecting element 60a extends outwardly from the receiving end of the female termination portion. This is an optional configuration, yet it is not necessary for successfully employing the invention. The electrical connecting element 60a, as shown in FIGS. 8a and 8b need not extend outwardly. Extending outwardly provides for alignment to occur in a quicker fashion and provides improved electrical contact resistance by increasing contact surface area.

As shown in this second embodiment, in FIG. 8a, the opposite end can extend beyond the inner sleeve 46a. In essence, as seen in FIGS. 8a, 8b, and 9, the electrical conductor 62a, such as a wire, tape form, or the like is coupled to the electrical connecting element 60a. This electrical conductor 62a extends from the electrical connecting element 60a through encapsulated material 52a and to the exterior of the cryogenic guide channel 50a. This will allow for the electrical conductor of the conventional conduit, illustrated, but not labeled, to mate with the electrical connecting element 60a via the electrical conductor 62a. Such a configuration will ensure electrical communication within the female portion of the coupler of the present invention.

Figure 7A:
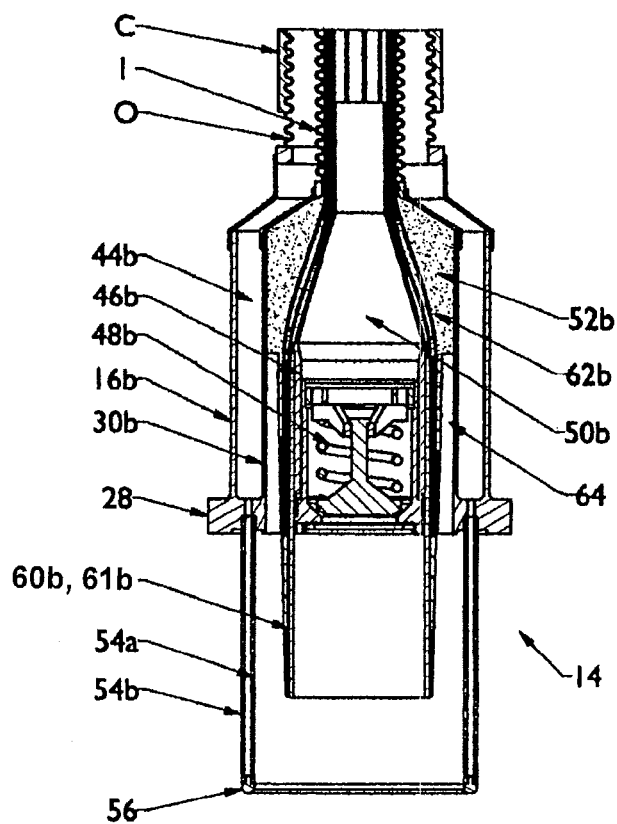
FIG. 7a is a cross-sectional view of the second embodiment for the male termination portion of the coupling device of the present invention.
Figure 7B:
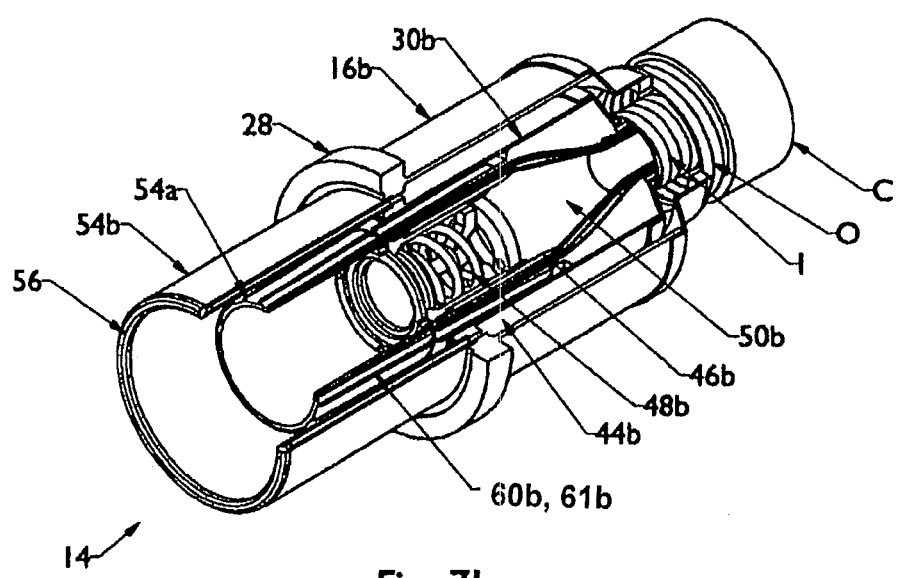
FIG. 7b is a partial cut-away isometric view of the second embodiment for the male termination portion of the coupling device of the present invention.

The male termination portion 14, for this second embodiment is shown in FIGS. 7a, 7b and 9. As with the previous embodiment, this male termination portion will mate with and receive the female termination portion 12 to provide for a connector that enables fluid flow as well as simultaneous electrical connection. Disconnection of the male termination portion 14 to the female termination portion will prevent fluid flow and will disconnect electrical connection.

To provide for such a configuration, the male termination portion 14 further includes an inner shell 30b having opposite ends. The first end, illustrated, but not labeled, being substantially the same as the first end 32a of the female termination portion 12. Thereby, the first end being designed and configured to include several tubes or conical structures, so as to make a hermetic seal to the end of the inner jacket I of the conventional conduit C. This configuration being substantially the same as the configuration for the first end of the first embodiment of the male termination portion 14.

Securing the outer shell 16a of the female termination portion to the outer shell of the male termination portion, a locking means is utilize. The male outer shell 16b includes a sealing collar 28. The female outer shell 16a includes a collar receiving component 26 that is designed and configured to receive the sealing collar. The use of the sealing collar and collar receiving component will ensure the attachment of the female termination portion to the male termination portion. This configuration being substantially the same as the first embodiment of the present invention.

Extending outwardly from the sealing collar 28 is an inner nested tube 54a and an outer nested tube 54b. The inner nested tube 54a includes outer ends that are illustrated, but not labeled. The first end of the inner nested tube being secured to the inner shell 30b via the sealing collar 28. This will provide for the first end of the inner nested tube 54a to be hermetically sealed to the inner shell 30b. The outer nested tube 54b being secured to the outer shell 16b via the sealing collar 28. This will provide for the first end of the outer nested tube 54b to be hermetically sealed to the outer shell 16b. The outer nested tube 54b being secured to the inner nested tube via end member 56. Like the first embodiment, a circumferential opening 58 extends through the sealing collar 28. This opening is evacuated to provide an insulating space between inner and outer tubes 54a and 54b. Like the first embodiment, this circumferential opening has been utilized to produce favorable results. Alternatively, a plurality of apertures or openings can be used in lieu of the circumferential opening.

The nested tubes, 54a and 54b, respectively, are designed and configured to be received within the gap formed between the inner nested tube 34 and the outer nested tube 36 of the female termination portion 12. The receipt of the outer nested tubes received within the female termination portion is shown in FIG. 9.

As seen in FIGS. 7a, 7b and 9, the hermetically sealed ends of outer shell, inner shell, outer nested tube and inner nested tube inherently form an evacuated space 44b. This evacuated space is in communication with the evacuated space in the conventional vacuum jacket cryogenic conduit (space located between the inner and outer jackets, I and O respectfully). The configuration of the evacuated space 44b is such that the outer shell 16b will be coupled to the outer jacket in order to assure that the joint will be sealed against vacuum.

Located within the inner shell 30b is an inner sleeve 46b. Secured within the inner sleeve 46b is a conventional valve member 48b. Extending outwardly from the valve member 48b is a cryogen guide channel 50b. Securing the valve member 48b and the cryogen guide channel 50b to the inner shell 30b is an encapsulated filled material which innately forms an encapsulated filled region 52b. This encapsulated filled region will aid in the prevention of leakage of the cryogenic medium.

The electrical connecting element 60b is located within the male termination portion of the present invention. Like the electrical connecting element 60a of the female termination portion, it is comprised of a circular array of several wedge-shaped contacts 61b, soldered to an electrical conductor 62b on the backside. The electrical conductor can be any conventional electrical element that will enable electricity to travel therethrough. Electrical conductors, such as, but not limited to copper wiring, high temperature superconducting (HTS) tape or the like can be utilized. It is noted that this particular embodiment has used HTS to produce favorable results. As seen in the drawings, each contact is electrically isolated from its neighbors. For this male portion, the electrical contacts being extension members that are adapted to be received with the receiving portion of the electrical contacts of the female termination portion. This will inherently provide for communication to occur between the male and female termination portions of the present invention.

As shown in FIGS. 7a, 7b and 9, this electrical connecting element 60b extends outwardly from the receiving end of the male termination portion and is located between the inner shell 30b and the inner sleeve 46b. It opposite end of the electrical connection element 60b extends to the opposite end of the inner shell 30b. This end is secured to the encapsulated material 52b. The electrical conductor 62b, such as a wire, tape form, or the like is coupled to the electrical connecting element 60b. This electrical conductor 62b extends from the electrical connecting element 60b through encapsulated material 52b and to the exterior of the cryogenic guide channel 50b. This will allow for the electrical conductor of the conventional conduit, illustrated, but not labeled, to mate with the electrical connecting element 60b to via the electrical conductor 62b. Such a configuration will ensure electrical communication within the female portion of the coupler of the present invention.

A gap 64 is formed between the electrical connecting element 60b and the inner shell 30b. This gap or opening 64 is to receive the extended portion of the electrical connecting element 60a of the female termination portion 12. Thus the gap 64 is a receiving member for the electrical connection element 60a of the female termination portion.

During utilization of this embodiment of the present invention, the valve in the male and female termination portions prevent fluid flow to occur during the disconnect stage via the valve members. Upon connection, the nested tubes 54a and 54b of the male termination portion is inserted in between the inner nested tube 34 and the outer nested tube 36 of the female termination portion. Once located therein, the receiving collar of the female portion will receive the sealing collar of the male portion to lock and secure the male termination portion to the female termination portion. For securing the female to the male termination portions, a conventional locking system can be used. In the preferred embodiment, the locking system is a threaded means. This will provide for the female and male portions to be threadably secured to one another. It is noted that other locking systems can be used to produce favorable results.

Once locked in place, the valves are activated for enabling fluid flow to occur. Due to the extended length of the elongated inner nested tube 54a and outer nested tube 54b, minimal heat loss occurs. Consequently increasing the success and efficiency of the connector of the present invention.

Simultaneously, as the fluid flow occurs or is terminated, electrical connection is achieved or terminated. The outer end of the connecting element 60a of the female termination portion is received within the gap 64 defined by the electrical connection element 60b and the inner shell 30b of the male termination portion. Once received, contact is made between the connecting element 60a of the female termination portion and the connection element 60b of the male termination portion. This will allow for electrical communication to occur between the conventional electrical conduit to the female electrical connection element 60a via electrical conductor 62a. The communication between the female electrical connection element 60a to the male electrical connection element 60b occurs via contact therewith. From the male electrical connection element 60b electrical communication continues to the convention electrical conduit via the male electrical conductor 62b. Thereby producing device that can successfully and efficiently provide a quick disconnect termination or activation for a cryogenic transfer line, while enabling electrical communication to continue or be discontinued, dependent upon the activation or deactivation mode.

Alternatively, other electrical connection elements can be used, so as to enable a device that can accommodate any conventional round electrical conductors. Such an embodiment is illustrated in FIG. 10a-FIG. 11b. Like the first and second embodiments, there is provided female and male termination portions having an outer shell, 16a and 16b, respectively. Like the first and second embodiments, these outer shells are substantially the same and thus include receiving ends, illustrated but not labeled, that are suited for mating with a conventional cryogenic conduit.

A conventional cryogenic conduit C, partially shown includes an inner jacket I and an outer jacket O. As discussed previously, the purpose of the receiving ends is to receive these members and to provide for a hermetic seal. Thereby, the receiving end being dependent upon the structure the conventional cryogenic conduit.

It is noted that shown is the use of female and male connecting means, but it is to be understood by those skilled in the art that other forms can be utilized when mating or connecting the termination portions.

Figure 11A:
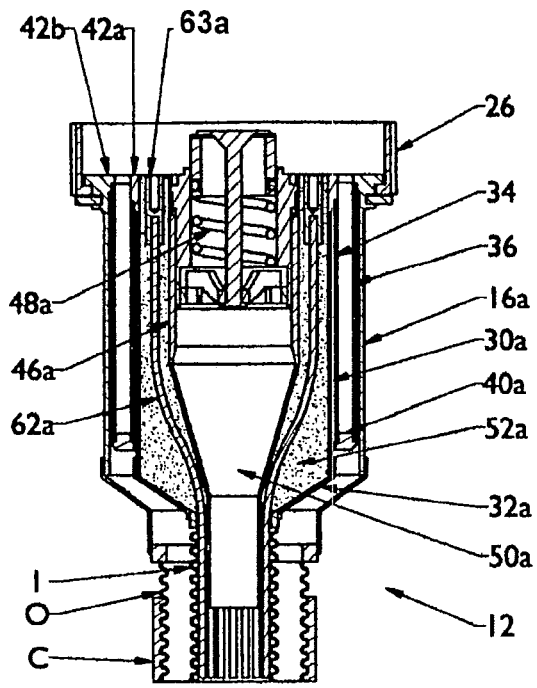
FIG. 11a is a cross-sectional view of the third embodiment for the female termination portion of the coupling device of the present invention.
Figure 11B:
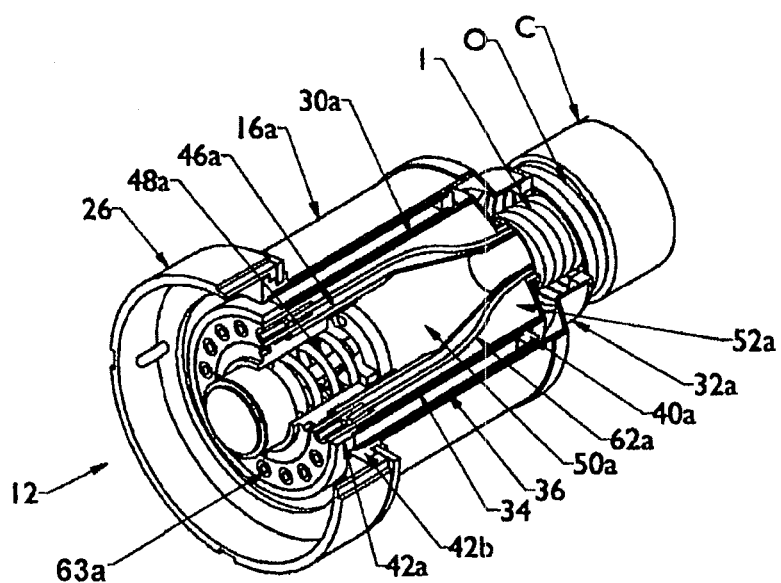
FIG. 11b is a partial cut-away isometric view of the third embodiment for the female termination portion of the coupling device of the present invention.
Figure 12:
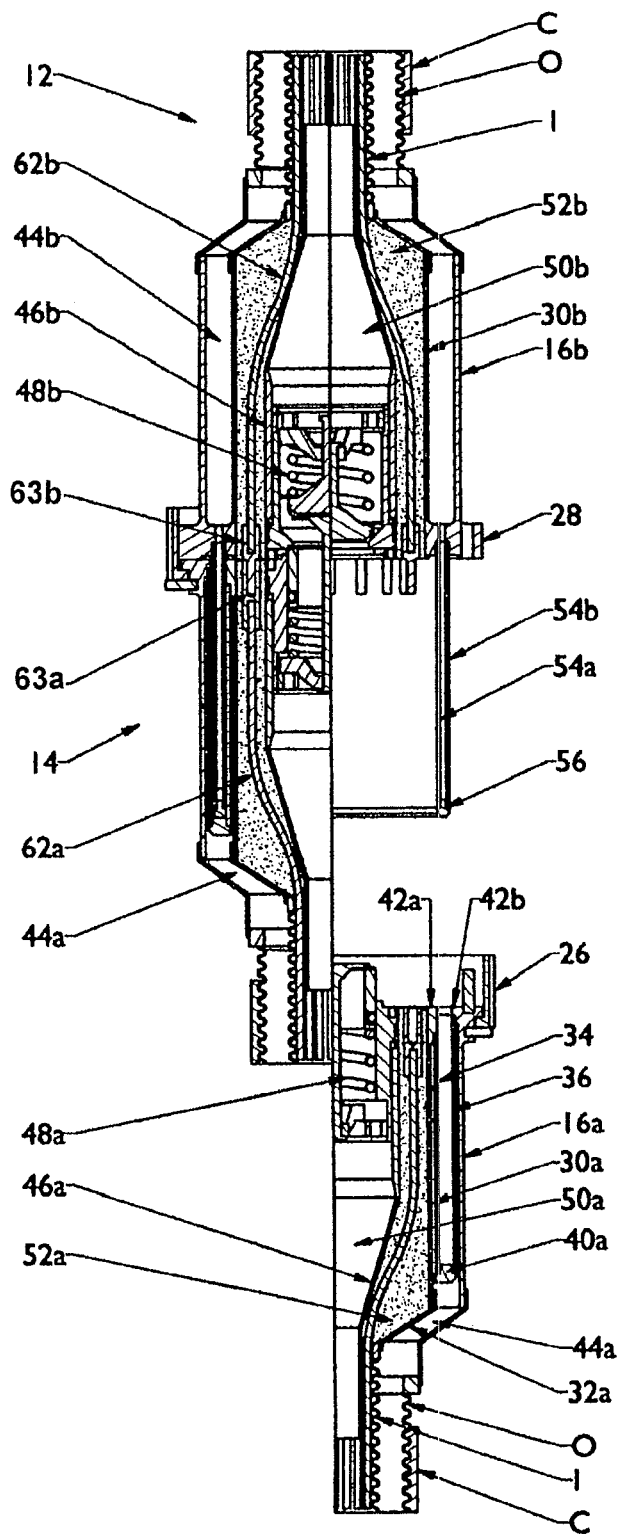
FIG. 12 is a cross-sectional view of the male termination portion mating with the female termination portion for the third embodiment of the present invention and illustrating the mating of the electrical connecting element.

The female termination portion 12, shown in FIGS. 11a, 11b, and 12 includes a female mating member being substantially the same as the female mating member as disclosed in the first embodiment. Like the first and second embodiments, the inner shell 30a includes opposite ends 32a and 32b; wherein the first end 32a being designed and configured to include several tubes or conical structures, so as to make a hermetic seal to the end of the inner jacket I of the conventional conduit C.

As disclosed in the first and second embodiment located between and parallel to the inner shell 30a and the outer shell 16a are an inner nested tube 34 and an outer nested tube 36. Inherently forming a gap that receives the male mating member 24b of the male termination portion 12, as shown in FIG. 12. Spacers 40a and 40b and spacer members 42a and 42b are used to provide the adequate hermetic seal for the nested tubes 34 and 36. Evacuated space 44a will be in communication with the evacuated space in the conventional vacuum jacket cryogenic conduit, as discussed in the first and second embodiments.

The inner sleeve 46 houses the conventional valve member 48a. Similar to the first and second embodiments, extending outwardly from the valve member 48a is a cryogen guide channel 50a. An encapsulated filled material 52a secures the inner sleeve to the inner shell 30a.

Contained in the annular region between the inner sleeve 46a and the inner shell 30a is the electrical connecting element. In this embodiment the electrical connection element comprises a plurality of socket members 63a. The socket members 63a include a first end that extends outwardly from the encapsulated filled material 52a and a second end that includes a receiving means for receiving the electrical conductors 62a. As illustrated in FIG. 11a, the electrical conductors 62a are in electrical communication with the socket members 63a as well as being embedded within the encapsulated material. The electrical conductor can be any conventional electrical element that will enable electrical communication therethrough.

Figure 10A:
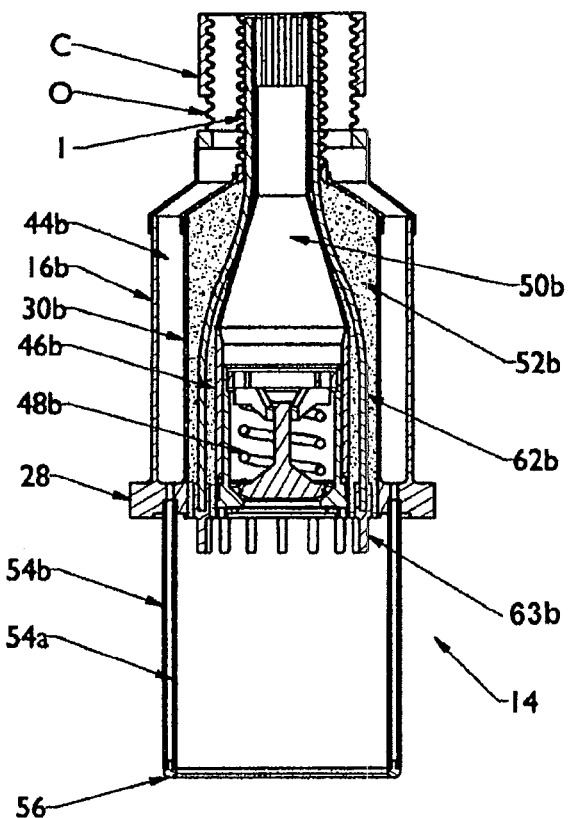
FIG. 10a is a cross-sectional view of the third embodiment for the male termination portion of the coupling device of the present invention.
Figure 10B:
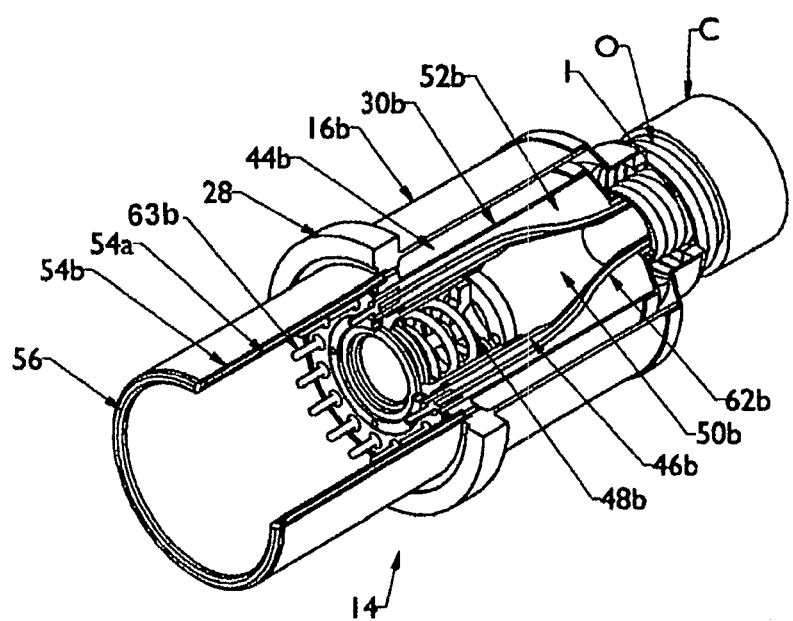
FIG. 10b is a partial cut-away isometric view of the third embodiment for the male termination portion of the coupling device of the present invention.

The male termination portion 14, for this third embodiment is shown in FIGS. 10a, 10b and 12. As with the previous embodiment, this male termination portion will mate with and receive the female termination portion 12 to provide for a connector that enables fluid flow as well as simultaneous electrical connection. Disconnection of the male termination portion 14 to the female termination portion will prevent fluid flow and will disconnect electrical connection.

To provide for such a configuration, the male termination portion 14 being substantially the same as the first and second embodiment, thus includes an inner shell 30b having opposite; wherein the first end being designed and configured to include several tubes or conical structures, so as to make a hermetic seal to the end of the inner jacket I of the conventional conduit C.

A locking means is utilized for locking the male portion to the female portion. Sealing collar 28 is received within the collar receiving component 26. This configuration being substantially the same as the first embodiment of the present invention.

Inner nested tube 54a and an outer nested tube 54b extend outwardly from the sealing being secured to the inner nested tube via end member 56. A circumferential opening 58 extends through the sealing collar 28. This opening is evacuated to provide an insulating space between inner and outer tubes 54a and 54b. Like the first embodiment, this circumferential opening has been utilized to produce favorable results. Alternatively, a plurality of apertures or openings can be used in lieu of the circumferential opening.

The nested tubes, 54a and 54b, respectively, are designed and configured to be received within the gap formed between the inner nested tube 34 and the outer nested tube 36 of the female termination portion 12. The receipt of the outer nested tubes received within the female termination portion is shown in FIG. 12.

Evacuated space 44b is in communication with the evacuated space in the conventional vacuum jacket cryogenic conduit (space located between the inner and outer jackets, I and O respectfully). A conventional valve member 48b is located within inner sleeve 46b of the inner shell 30b. Extending outwardly from the valve member 48b is a cryogen guide channel 50b. An encapsulated filled material, forming an encapsulated filled region 52b, secures the valve member and cryogen guide channel to the inner shell 30b.

In this embodiment, the electrical connecting element is designed and configured to mate with the electrical connection element of the female mating member. Thereby, the electrical connecting element as shown include a plurality of pins 63b having a first end and a second end. The first end extends outwardly from the encapsulated filled material 52b and the second end includes a receiving means for receiving the electrical conductors 62b. As illustrated, the electrical conductors are in electrical communication with the pin members 63b as well as being embedded within the encapsulated material. The electrical conductor can be any conventional electrical element that will enable electrical communication therethrough.

Thereby, to utilize this embodiment, the nested the nested tubes 54a and 54b of the male termination portion is inserted in between the inner nested tube 34 and the outer nested tube 36 of the female termination portion. This will inherently provide for the pins 63b to be received with the socket 63a. Securing of the two termination portions is accomplished via the locking system. Once locked fluid flow occurs since the valves will be in an opened position and electrical communication occurs. Disconnection of the male and female termination portions provides for simultaneous termination of fluid flow and electrical flow.

In essences for providing a quick-connect coupling for use in a cryogenic system and enabling electrical communication to occur simultaneously, the present invention is employed. For allowing this connection to occur between two conventional conduits, the following procedure is disclosed. Securing the female and male termination portions to the respective ends of a conventional conduit. Mating to ensure a hermetic seal is achieved. Attaining electrical communication from the conventional conduits through the respective termination portion through electrical conductors located therein and to the respective electrical connecting element. Controlling fluid flow from the conventional conduits via valves and flow paths located within each termination portion. Maintaining a vacuum space within each of said termination portion. Including a heat conduction path for successfully minimizing the transfer of heat from the surrounds to the cryogenic space.

Aligning mating means for enable the female termination portion to receive the male termination portion. Receiving the mating and securing the termination portions via a securing means. Once secured, transferring cryogenic fluid from one line to the other is achieved via the valves and cryogenic flow path. Electrical communication is achieved via the mating between the electrical connection elements.

A quick-disconnect is achieved by reversing the process defined above. Hence, the securing means is released for enabling the male termination portion to disengage with the female termination portion. Disengagement provides for the valves to close, ceasing fluid communication. Termination of the electrical connection elements provides for electrical communication to cease.

While the invention has been particularly shown and described with reference to an embodiment thereof, it will be understood by those skilled in the art that various changes in form and detail may be made without departing from the spirit and scope of the invention.

I claim:

1. A first termination portion of a coupling device for enabling a connection and/or disconnection of a vacuum-jacketed cryogenic conduit, the first termination portion configure to mate with a second termination portion of the coupling device, the first termination portion of the coupling device comprising:
   a first end having a receiving portion configured to receive the vacuum-jacketed cryogenic conduit,
   a second end having a mating portion,
   an outer shell,
   an inner shell disposed within and spaced apart from the outer shell such that a volume is formed between the inner shell and the outer shell, the volume being evacuated,
   a sleeve disposed within and spaced apart from the inner shell, an interior of the sleeve forming a through-channel extending from the first end to the second end, and
   a fluid flow controller disposed within the sleeve, the fluid flow controller configured to control fluid flow between the corresponding vacuum-jacketed cryogenic conduit and mating portion,
   a plurality of electrical contacts disposed in the through-channel, each electrical contact electrically isolated from the other of the plurality of electrical contacts,
   wherein the mating portion of the first termination portion of the coupling device is configured to be removably secured to a corresponding mating portion provided on the second termination portion of the coupling device so that when the first termination portion of the coupling device is secured to the second termination portion of the coupling device, the through-channel of the first termination portion of the coupling device is in fluid communication with a corresponding fluid channel of the second termination portion of the coupling device, and the electrical contacts of the first termination portion of the coupling device are in electrical contact with corresponding electrical contacts of the second termination portion of the coupling device.

2. A coupling device for enabling a connection and/or disconnection between two vacuum-jacketed cryogenic conduits, said coupling device comprising:

a pair of mating termination portions, each termination portion including
an outer shell,
an inner shell disposed within and spaced apart from the outer shell such that a volume is formed between the inner shell and the outer shell, the volume being evacuated,
a sleeve disposed within and spaced apart from the inner shell, an interior of the sleeve forming a through channel, and
a fluid flow controller disposed within the sleeve, the fluid flow controller configured to control fluid flow between the corresponding vacuum-jacketed cryogenic conduit and mating portion, and
a plurality of electrical contacts disposed in the through-channel, each electrical contact electrically isolated from the other of the plurality of electrical contacts,
wherein each termination portion is configured to
connect to an end of a respective one of the cryogenic conduits, and
be removably secured to each other via corresponding mating portions provided on each termination portion,
so that when the pair of termination portions are mated, the respective fluid flow controllers of the termination portions are activated, placing the through-channel of one of the pair of termination portions into fluid communication with the through-channel of the other of the pair of termination portions, and the electrical contacts of the one of the pair of termination portions are in electrical contact with corresponding electrical contacts of the other of the pair of termination portions.

3. The coupling device of claim 2, wherein the electrical contacts are connected to a high temperature superconducting flat tape conductor, and at least a portion of the conductor is disposed within the through-channel.

4. The coupling device of claim 2, wherein the electrical contacts include a thickness in a radial direction of the termination portion, and are configured so that the thickness varies linearly along an axial direction of the termination portion.

5. The coupling device of claim 2, wherein at least one of the electrical contacts is wedge-shaped.

6. The coupling device of claim 2, wherein each through-channel is configured to receive cryogenic fluid and be in fluid communication with cryogenic fluid of the corresponding vacuum-jacketed cryogenic conduit.

7. The coupling device of claim 2, wherein the electrical contacts are disposed in an annular space between the sleeve and the inner shell.

8. The coupling device of claim 2, wherein the electrical contacts are arranged in a circular array within the through-channel.

9. The coupling device of claim 2, wherein the through-channel is configured to receive a cryogenic fluid consisting of a single phase or two phase cryogenic cooling fluid selected from the group consisting of helium, nitrogen, air, argon, oxygen, hydrogen, xenon, neon, methane, or a mixture thereof.

10. The coupling device of claim 2, wherein the electrical contacts are made via a pressed contact, a spring loaded contact, a soldered contact, a brazed contact, a welded contact, or a combination thereof.

11. The coupling device of claim 2, wherein the electrical contacts include a coating, said coating being selected from the group consisting of Au, Ag, Ni, solder for providing an environmental protection and lowering electrical contact resistance.

12. A coupling device for enabling a quick connection and/or disconnection between two vacuum-jacketed cryogenic conduits, said coupling device comprising:
a first termination portion including
a first end having a first receiving portion configured to receive one of said vacuum-jacketed cryogenic conduits,
a second end having a first mating portion,
a first outer shell,
a first inner shell disposed within and spaced apart from the first outer shell, and
a first electrical connector disposed within the first inner shell,
wherein the space between the first inner shell and the first outer shell defines a vacuum space that thermally insulates the first electrical connector, and
a second termination portion including
a third end having a second receiving portion configured to receive the other of said vacuum-jacketed cryogenic conduits
a fourth end having a second mating portion,
a second outer shell,
a second inner shell disposed within and spaced apart from the second outer shell, and
a second electrical connector disposed within the second inner shell, wherein the space between the second inner shell and the second outer shell defines a vacuum space that thermally insulates the second electrical connector, and
wherein the first termination portion and the second termination portion are removably securable to each other via said first mating portion and said second mating portion, and
the first and second electrical connectors are configured to provide electrical communication between said first termination portion and said second termination portion when the first termination portion and the second termination portion are secured to each other.

13. The coupling device of claim 12, wherein the first and second electrical connectors are connected to respective a high temperature superconducting flat tape conductor, and the conductor is disposed within the respective through-channel.

14. The coupling device of claim 12, wherein the first and second electrical connectors include a thickness in a radial direction of the termination portion, and are configured so that the thickness varies linearly along the axial direction of the termination portion.

15. The coupling device of claim 12, wherein the first and second electrical connectors are wedge-shaped.

16. The coupling device of claim 12, wherein the first termination portion further includes
a first sleeve disposed within the first inner shell, and
a first fluid valve disposed within the first sleeve, the first fluid valve configured to control fluid flow through the first sleeve between the first end and the second end, and
the second termination portion further includes
a second sleeve disposed within the second inner shell, and
a second fluid valve is disposed within the second sleeve, the second fluid valve configured to control fluid flow within the second sleeve between the third end and the fourth end,
wherein the first fluid valve and the second valve fluid are in an open position when the first termination portion is secured to the second termination portion such that fluid can flow between said vacuum jacketed cryogenic conduits, and the first fluid valve and the second fluid valve are in a closed position when the first termination portion is disengaged from the second termination portion such that fluid flow through the respective termination portions can be prevented.

17. The coupling device of claim 16, wherein the first electrical connector is disposed in an annular space between the first inner shell and the first sleeve, and the second electrical connector is disposed in an annular space between the second inner shell and the second sleeve.

18. The coupling device of claim 16, wherein the first sleeve and the second sleeve are each configured to receive cryogenic fluid and be in fluid communication with cryogenic fluid of the corresponding vacuum-jacketed cryogenic conduit.

* * * * *